US008060385B1

(12) United States Patent
Strannigan et al.

(10) Patent No.: US 8,060,385 B1
(45) Date of Patent: Nov. 15, 2011

(54) SYSTEM, PROGRAM PRODUCT AND METHOD FOR SEGMENTING AND UNDERWRITING USING VOTING STATUS

(75) Inventors: Gary Strannigan, Everett, WA (US); Tammy Dye, Bothell, WA (US)

(73) Assignee: Safeco Insurance Company of America, Seattle, WA (US)

( * ) Notice: Subject to any disclaimer, the term of this patent is extended or adjusted under 35 U.S.C. 154(b) by 899 days.

(21) Appl. No.: 11/952,474

(22) Filed: Dec. 7, 2007

Related U.S. Application Data

(60) Provisional application No. 60/869,127, filed on Dec. 8, 2006.

(51) Int. Cl.
*G06Q 40/00* (2006.01)
(52) U.S. Cl. ............................................. 705/4; 705/35
(58) Field of Classification Search .................. 705/4, 35
See application file for complete search history.

(56) References Cited

U.S. PATENT DOCUMENTS

| | | | |
|---|---|---|---|
| 4,831,526 A | 5/1989 | Luchs et al. |
| 4,975,840 A | 12/1990 | DeTore et al. |
| 5,231,571 A | 7/1993 | D'Agostino |
| 5,523,942 A | 6/1996 | Tyler et al. |
| 5,673,402 A | 9/1997 | Ryan et al. |
| 5,749,081 A | 5/1998 | Whiteis |
| 5,873,066 A | 2/1999 | Underwood et al. |
| 5,970,464 A | 10/1999 | Apte et al. |
| 6,021,403 A | 2/2000 | Horvitz et al. |
| 6,058,369 A | 5/2000 | Rothstein |
| 6,064,970 A | 5/2000 | McMillan et al. |
| 6,272,528 B1 | 8/2001 | Cullen et al. |
| 6,526,386 B1 | 2/2003 | Chapman et al. |
| 6,594,635 B1 | 7/2003 | Erlanger |
| 6,684,189 B1 | 1/2004 | Ryan et al. |

(Continued)

FOREIGN PATENT DOCUMENTS

EP    0 935 208 A2    8/1999

(Continued)

OTHER PUBLICATIONS

Northeast Action, Boston, MA; Putting List Enhancement to Work—Ideas on How to Use Enhanced Lists Effectively and Creatively; Internet pp. 1-8; printed Mar. 12, 2008.

(Continued)

*Primary Examiner* — Thu Thao Havan
(74) *Attorney, Agent, or Firm* — Alston & Bird LLP

(57) ABSTRACT

A system, method and computer program product for utilizing a person's voting status as a factor in segmenting a population, and in various aspects of selling, underwriting, or rating insurance. Voting status may include voter registration, eligibility for voter registration, an instance of recent voting, voting frequency, or other voting history in elections. In defining voting status, an instance of recent voting, voting frequency, or other voting history may optionally take into account the type of election or the turnout for the election, or both. Voting status may be used together with other factors such as age, gender, driving distance to place of employment, or residence location. A risk model for insurance purposes is provided, including segmentation of a population into groups based factors including voting status; and determining risk parameters of each group. A rate structure corresponding to the segmented groups may be calculated, and insurance coverage limits and a premium proposed to a customer based on a group assignment. Persons to receive insurance sales solicitations may be identified based on voting status.

25 Claims, 4 Drawing Sheets

U.S. PATENT DOCUMENTS

| | | |
|---|---|---|
| 6,868,386 B1 | 3/2005 | Henderson et al. |
| 6,938,022 B1 | 8/2005 | Singhal |
| 6,985,886 B1 | 1/2006 | Broadbent et al. |
| 7,072,841 B1 | 7/2006 | Pednault |
| 7,181,427 B1 | 2/2007 | DeFrancesco et al. |
| 7,240,017 B2 | 7/2007 | Labelle et al. |
| 7,277,861 B1 | 10/2007 | Benson et al. |
| 7,386,463 B2 | 6/2008 | McCabe |
| 7,610,210 B2 | 10/2009 | Helitzer et al. |
| 7,711,584 B2 | 5/2010 | Helitzer et al. |
| 2002/0002475 A1 | 1/2002 | Freedman et al. |
| 2002/0035488 A1 | 3/2002 | Aquila et al. |
| 2002/0038363 A1 | 3/2002 | MacLean |
| 2002/0040312 A1 | 4/2002 | Dhar et al. |
| 2002/0059137 A1 | 5/2002 | Freeman et al. |
| 2002/0111835 A1 | 8/2002 | Hele et al. |
| 2002/0116228 A1 | 8/2002 | Bauer et al. |
| 2002/0116231 A1 | 8/2002 | Hele et al. |
| 2002/0120474 A1 | 8/2002 | Hele et al. |
| 2002/0128882 A1 | 9/2002 | Nakagawa et al. |
| 2002/0143680 A1 | 10/2002 | Walters et al. |
| 2002/0194033 A1 | 12/2002 | Huff |
| 2003/0093302 A1 | 5/2003 | Quido et al. |
| 2003/0125990 A1 | 7/2003 | Rudy et al. |
| 2003/0167191 A1 | 9/2003 | Slabonik et al. |
| 2003/0171959 A1 | 9/2003 | Galloway |
| 2003/0200125 A1 | 10/2003 | Erlanger |
| 2003/0229522 A1 | 12/2003 | Thompson et al. |
| 2004/0019508 A1 | 1/2004 | Yaruss et al. |
| 2004/0049450 A1 | 3/2004 | Lussler |
| 2004/0059653 A1 | 3/2004 | Verkuylen et al. |
| 2004/0117216 A1 | 6/2004 | Dutta et al. |
| 2004/0128170 A1 | 7/2004 | MacKethan et al. |
| 2004/0128172 A1 | 7/2004 | Van Cleave et al. |
| 2004/0153362 A1 | 8/2004 | Bauer et al. |
| 2004/0172304 A1 | 9/2004 | Joao |
| 2004/0215552 A1 | 10/2004 | Horn et al. |
| 2005/0010423 A1 | 1/2005 | Bagbey et al. |
| 2005/0108062 A1 | 5/2005 | Higgins |
| 2005/0240451 A1 | 10/2005 | Johnson et al. |
| 2006/0031159 A1 | 2/2006 | Minot et al. |
| 2006/0033625 A1 | 2/2006 | Johnson et al. |
| 2006/0059113 A1* | 3/2006 | Kuznar et al. ............... 706/45 |
| 2006/0136274 A1 | 6/2006 | Olivier et al. |
| 2006/0161462 A1 | 7/2006 | Sharma |
| 2006/0212195 A1 | 9/2006 | Veith et al. |
| 2006/0218014 A1 | 9/2006 | Walker et al. |
| 2006/0253305 A1 | 11/2006 | Dougherty |
| 2007/0016542 A1 | 1/2007 | Rosauer et al. |
| 2007/0021987 A1 | 1/2007 | Binns et al. |
| 2007/0038485 A1 | 2/2007 | Yeransian et al. |
| 2007/0038488 A1 | 2/2007 | Bauer et al. |
| 2007/0174096 A1 | 7/2007 | Cain et al. |
| 2007/0174179 A1 | 7/2007 | Avery |
| 2008/0027764 A1 | 1/2008 | Marturana et al. |
| 2008/0065426 A1 | 3/2008 | Ziade et al. |
| 2008/0154651 A1 | 6/2008 | Kenefick et al. |
| 2009/0048877 A1 | 2/2009 | Binns et al. |
| 2009/0119133 A1 | 5/2009 | Yeransian et al. |
| 2009/0177501 A1 | 7/2009 | Grover et al. |
| 2010/0004957 A1 | 1/2010 | Ball |

FOREIGN PATENT DOCUMENTS

| | | |
|---|---|---|
| WO | WO 99/48036 | 9/1999 |
| WO | WO 01/91017 A1 | 11/2001 |
| WO | WO 02/088889 A2 | 11/2002 |

OTHER PUBLICATIONS

Ron Fein Consulting, List Enhancement Fields, Mar. 31, 2000; pp. 1-12.

Gilderbloom, J.; Markham, J., The Impact of Homeownership on Political Beliefs, one page; University of North Carolina Press; Jun. 1995. Abstract Only.

Alberto Simpser; Theory of Corrupt Elections, html version of file http://cas.uchicago.edu/workshops/cpolit/papers/simpser2006.pdf; Sep. 10, 2006; pp. 1-60.

Green, Meg, Automated Underwriting Helps Safeco Rate Commercial Risks; Best's Review, vol. 106, No. 1., p. 106, May 1, 2005.

Amoroso, R., et al., Secrets to Successful Commercial Segmentation, Best's Review, vol. 107, Issue 3; 7 pages, Jul. 1, 2006.

Apte, Grossman et al.; Research Report, Insurance Risk Modeling Using Data Mining Technology, 10 pages, IBM Research Division, IBM T.J. Watson Research Center, Mar. 31, 1998.

VCS, The First Place for Voter File Information, The National Political Database, 28 pages, copyright, 1997.

Office Action from U.S. Appl. No. 11/555,043 mailed Mar. 17, 2010.
Office Action from U.S. Appl. No. 11/555,043 mailed Aug. 4, 2010.
Office Action dated Nov. 17, 2008, U.S. Appl. No. 11/617,426, filed Dec. 28, 2006.
Office Action dated Apr. 16, 2009, U.S. Appl. No. 11/617,426, filed Dec. 28, 2006.
Office Action from U.S. Appl. No. 11/555,026 mailed Aug. 3, 2010.
Office Action from U.S. Appl. No. 11/555,026 mailed Mar. 8, 2010.
Office Action from U.S. Appl. No. 11/617,395 mailed Jun. 22, 2010.
Office Action from U.S. Appl. No. 11/617,395 mailed Nov. 24, 2010.
Office Action from U.S. Appl. No. 11/617,395 mailed Aug. 3, 2010.
Office Action from U.S. Appl. No. 11/617,395 mailed Jan. 26, 2010.

Ian Turvill, The 21$^{st}$ century insurer: Beyond price—Successful responses to shrinking opportunities, pp. 11-12, Fall 2006/Winter 2007, vol. 30, #3, View Points, Fair Isaac Corporation.

Alexander Felfernig, Koba4MS: Selling Complex Products and Services using Knowledge-based Recommender Technologies, 2005, pp. 1-9, IEEE International Conference on E-Commerce Technology.

Simon Field, A personalised needs oriented approach to insurance product sales, 2002, pp. 1-4, IBM Zurich Research Laboratory.

Raffi Kassarjian, Banking's customer imperative: Are you building on your advantage—or losing it?, pp. 1-5, Fall 2006/Winter 2007, vol. 30, #3, View Points, Fair Isaac Corporation.

View Points, Scotiabank set to reap rewards from customer-centric collections, p. 24, Fall 2006/Winter 2007, vol. 30, #3, View Points, Fair Isaac Corporation.

Acord Corporation, Acord 131 (1/96) Umbrella Section, 2 pages total, 1991.

* cited by examiner

SYSTEM, PROGRAM PRODUCT AND METHOD FOR SEGMENTING AND UNDERWRITING USING VOTING STATUS

CROSS REFERENCE TO RELATED APPLICATION

This application claims the benefit of U.S. Provisional Patent Application Ser. No. 60/869,127 entitled, "System and Method for Segmenting and Underwriting Using Voting Status," filed Dec. 8, 2006, the contents of which are hereby incorporated herein by reference in their entirety.

TECHNICAL FIELD

The present invention relates to use of a novel factor in insurance underwriting, and particularly to the use of voting habits, for example voting history, as such a factor in segmenting a population.

BACKGROUND

Actuaries develop risk models by segmenting large populations of policies into predictable risk groups, each with its own risk characteristics. Actuarial pricing methods often use predictive variables derived from various internal insurance company and external data sources to compute expected loss and loss ratio at the individual policy level.

The traditional method used by actuaries to construct risk models involves first segmenting the overall population of policyholders into a collection of risk groups based on a set of factors, such as age, gender, driving distance to place of employment, etc. The risk parameters of each group are then estimated from historical policy and claims data. Actuaries may employ a combination of intuition and trial-and-error hypothesis testing to identify suitable factors.

However, some partly automated approaches use a predictive modeling class library to discover risk characterization rules by analyzing large sets of insurance data. The values of particular risk factors that apply to a particular individual or business are given weight in such analyses based on predictive modeling. Risk groups and their associated risk characteristics can be expressed in the form of actuarial rules, each rule defining a distinct risk group and its level of risk, such as: male drivers under age 25 who drive sports cars have a claim frequency of 25% and an average claim amount of $3200. To be able to discover such rules from historical claims and policy data, predictive modeling based on rule induction can be utilized.

Examples of external data sources for such data include the C.L.U.E. database of historical homeowners' claims; the MVR (Motor Vehicle Records) database of historical motor claims and various databases of both personal and commercial financial stability (or "credit") information.

As described above, using predictive modeling, key variables that one must try to predict are claim frequency and claim severity, and thereby pure premium. Approaches to predictive modeling are described in C. Apte, et al., "Research Report: Insurance Risk Modeling Using Data Mining Technology," IBM Research Division (31 Mar. 1998); U.S. Pat. No. 4,975,840 issued Dec. 4, 1990, to DeTore et al.; and U.S. Patent Publication 20060136273, Jun. 22, 2006, each of which is incorporated herein by reference in its entirety. Apte, et al., note that P&C companies continually refine both the delineations they make among risk groups and the premiums they charge.

Thus, insurance companies generally seek to improve the accuracy of their risk analysis. They collect many data fields for each policy they underwrite. From time to time, the use of certain consumer data for underwriting (for example credit scores or neighborhood boundaries) comes under attack for philosophical or political reasons. Thus, there is a need to identify factors for use in classifying prospective insureds.

SUMMARY OF THE INVENTION

The present invention addresses needs in the art by utilizing a person's voting status as a factor in segmenting a population, and in various aspects of selling, underwriting, or rating insurance. Voting status may include, one or more of, without limitation thereto, voter registration, eligibility for voter registration, an instance of recent voting, voting frequency, or other voting history in elections. In defining voting status, an instance of recent voting, voting frequency, or other voting history may optionally take into account the type of election or the turnout for the election, or both.

According to one aspect, the present invention provides a method, system, apparatus, and computer program product for providing a risk model for insurance purposes, including segmenting a population into groups based on one or more factors including voting status; and determining risk parameters of each group. According to one embodiment of the invention, a risk parameter includes predicted claim frequency. According to another embodiment of the invention, the risk parameters include predicted claim frequency and claim severity. According to another embodiment voting status may include the number of times an individual voted in a predetermined number of recent elections. According to another embodiment determining risk parameters includes weighing an individual's voting frequency based on voter participation in each of said elections.

In one exemplary embodiment of this aspect of the invention, the insurance comprises property and casualty insurance, and the set of factors further includes one or more of age, gender, driving distance to place of employment, or residence location. Optionally, determining risk parameters includes conducting predictive modeling. According to an embodiment of the invention, a plurality of factors further include data from one or more internal data sources of an insurance provider and one or more external data sources. The one or more external data sources may include a commercial vendor source for a voter file, or a governmental vendor source for a voter file.

The invention further provides a method of underwriting and rating an insurance policy comprising providing a risk model according to one of the foregoing embodiments of the invention, determining a rate structure corresponding to the segmented groups, determining in which group a customer falls, and proposing insurance coverage limits and a premium to the customer based on that group assignment.

Voting status correlates with loss ratios. Generally, an increase in voting frequency, such as an instance of recent voting, correlates with a decrease in risk of insurance loss. Analysis of existing policy holder data has indicated a significant correlation between a person having voted at all and a lower likelihood that the person will claim a loss. Furthermore, a person who has voted within the last twelve months has an even lower likelihood that the person will claim a loss. Thus, a risk model developed according to the present invention provides insurance companies with a tool for more accurately classifying risk, for example predicting loss frequency.

According to another of its aspects, the present invention provides a method of selecting potential customers for insurance based on their voting status and directing insurance marketing efforts at such selected potential customers. For example, an insurance company may select registered voters, or persons who have registered and voted, as the targets of a promotional campaign, which may offer such persons competitive premiums based on lower loss ratios.

According to another of its aspects, the present invention provides a method of prescreening applicants for insurance based on their voting status.

According to another of its aspects, the present invention provides a method of adjusting an insurance agent's commissions based on the voting status of customers obtained by the agent.

An embodiment of the present invention provides a computing system for segmenting a population; comprising a data storage device, a voting status generator module programmed to obtain information providing voting status of members of a population; a predictive modeling module programmed to segment the population into groups based at least in part on voting status information stored in the data storage device, and to calculate risk parameters of each group; and an input/output system to transfer incoming voting status information obtained by the voting status generator module to the data storage device and to output information relating to the groups and their respective risk parameters. In one exemplary embodiment, the risk parameters may include at least one of predicted claim frequency or claim severity. Voting status may include one or more of voter registration, eligibility for voter registration, an instance of recent voting, or voting frequency. In one embodiment, a person's voting status may include whether the person voted in a selected type or types of election, or whether the person voted in an election that had a selected turnout characteristic (such as a low turnout election). In one embodiment, the voting status information may include the number of times an individual voted in a predetermined number of recent elections, and calculating risk parameters may include weighing an individual's voting frequency based on voter participation in each of said elections. The predictive modeling module may be programmed to segment the population into groups based additionally on one or more of age, gender, driving distance to place of employment, or location. In one embodiment, the predictive modeling module is programmed to segment the population into groups based on data stored in the data storage device received from one or more internal data sources of an insurance provider and one or more external data sources. The external data sources can be commercial vendor sources or governmental sources for a voter file.

According to another embodiment of the invention, there is provided a computerized method for constructing a segmentation-based model expressed in the form of actuarial rules, comprising presenting to a computer information providing voting status of members of a population; based at least in part on the voting status information, on the computer, generating a segmentation-based risk model by segmenting the population into groups and calculating risk parameters of each group; and outputting from the computer actuarial rules of the risk model. The risk parameters may include at least one of predicted insurance claim frequency or insurance claim severity. The actuarial rules may define a risk group and its level of risk.

Calculation of risk parameters based on voting status in some embodiments of the invention may include weighing elections in which members of the population voted according to the type of election, or according to the turnout for an election. Some types of elections, such as presidential elections or national elections or statewide elections or general legislative elections or primary elections preceding general elections or politically sensitive initiatives tend to have higher turnouts than other types, such as special elections or by-elections or local elections or uncontroversial referenda. On the other hand, a type of election that normally has a high turnout may unexpectedly have a low turnout. Thus, the correlation between voting and a lower likelihood that the voter will claim a loss will be expected to increase when the person votes in certain types of elections (normally low turnout), and also when the person votes in any election for which the turnout was low.

Another embodiment of the invention provides a computerized method for underwriting and rating an insurance policy based on a segmentation-based risk model, comprising receiving on a modeling computer module information providing voting status of members of a population; on the modeling computer module, based at least in part on the voting status information, generating a segmentation-based risk model by segmenting the population into groups and calculating risk parameters of each group; receiving, on an underwriting computer module, the risk model and voting status information characterizing an applicant for insurance; determining, on the underwriting computer module, based at least in part on the voting status information characterizing the applicant, into which segmented group the applicant falls; and determining, on the underwriting computer module, based on the group into which the applicant falls, whether to offer an insurance policy to the applicant. The underwriting computer module may receive the applicant's voting status information from a data source. In one embodiment, the underwriting computer module may receive the applicant's voting status information from a voting status generator computer module, the voting status generator computer module providing interactive interview questions to the applicant via a computer network, and receiving responses from the applicant via the network. The method may further comprise determining, on the underwriting computer module, a rate structure corresponding to the segmented groups, and proposing insurance coverage limits and a premium to the applicant based on the group into which the applicant falls. Proposing coverage limits and a premium may comprise sending coverage limits and a premium to the applicant via the Internet.

Another embodiment of the invention provides a method for identifying persons to receive insurance sales solicitations, comprising, on a computer processor, based on voting status information stored in a data storage module, generating a list of persons whose voting status comprises at least one of voter registration, eligibility for voter registration, an instance of recent voting, or voting frequency; outputting said list of persons; and directing a sales solicitations to one or more persons on said list. The solicitation may be sent via a computer network, such as the Internet.

Another embodiment of the invention provides a computer program product, comprising a computer readable medium having recorded thereon computer executable instructions for receiving information providing voting status of members of a population; based at least in part on the voting status information, generating a segmentation-based risk model by segmenting the population into groups and calculating risk parameters of each group; receiving voting status information characterizing an applicant for insurance; determining, based at least in part on the voting status information characterizing the applicant, into which segmented group the applicant falls; and determining, based on the group into which the applicant falls, whether to offer an insurance policy to the applicant.

Another embodiment of the invention provides a computer program product, comprising a computer readable medium having recorded thereon computer executable instructions for receiving information providing voting status of members of a population; based at least in part on the voting status information, generating a segmentation-based risk model by segmenting the population into groups and calculating risk parameters of each group; and outputting from the computer actuarial rules of the risk model.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
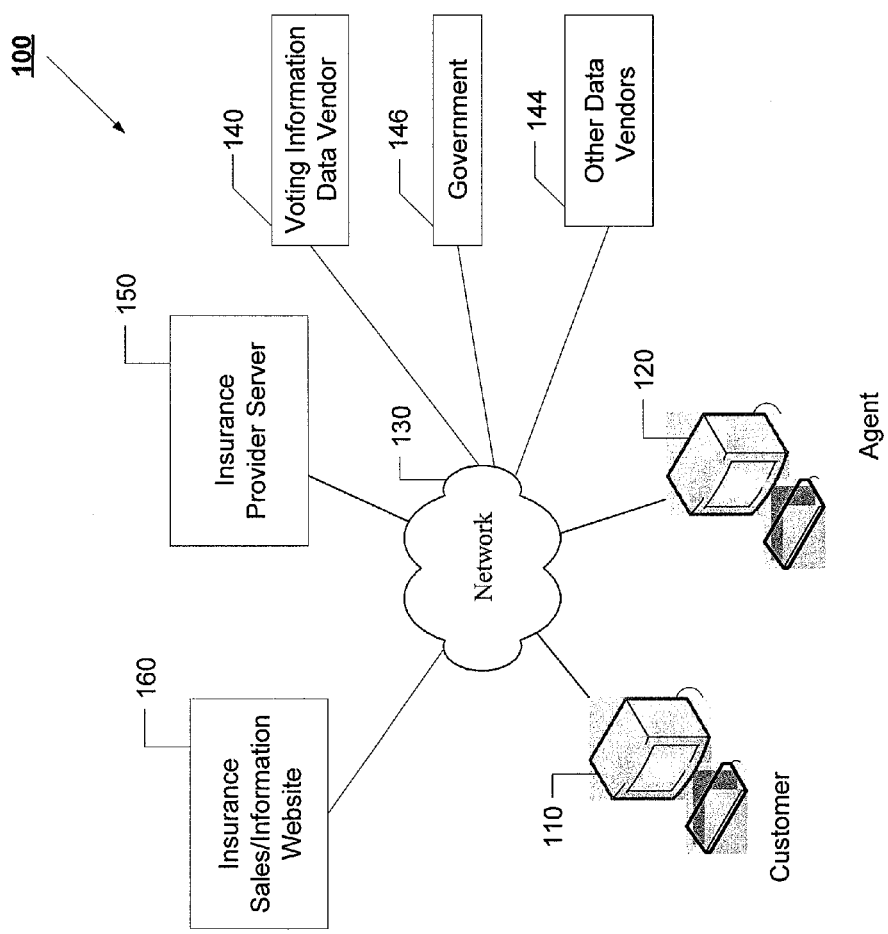
FIG. 1 provides a block diagram of a system for underwriting insurance in accordance with exemplary embodiments.

System Architecture:

FIG. 1 provides a block diagram of a system 100 for providing risk segmentation based at least in part on voting status, such as voting history or frequency, in accordance with various embodiments of the present invention. As may be understood from this figure, the system 100 may include one or more computing devices 110, 120, which may be used, for example by a customer or an advisor to access an insurance sales or information website 160 via a network 130 (e.g., a Local Area Network (LAN), wide area network (WAN), the Internet, or the like) for the purpose of buying or receiving quote information or recommendations for one or more insurance products, and/or for renewing or modifying an existing insurance product. Either or both computing device 110, 120 may include, for example, a personal computer (PC), laptop, personal digital assistant (PDA), cellular telephone, or similar electronic device. According to one exemplary embodiment, the insurance sales/information website 160 may be operated by an insurance provider server 150 by way of the same or a different network 130. In particular, as discussed in more detail below, the insurance provider server 150 of one exemplary embodiment may be configured to execute a voting frequency generator module and an underwriting and rating module, in order to generate and provide underwriting conclusions with regard to a customer. Such conclusions may be used internally by the insurance provider or may be shared with a customer or advisor by way of the insurance sales/information website 160. In other embodiments, the insurance sales/information website 160 may be operated by a third party for the purpose of allowing a customer or advisor to interface with systems of an insurance provider.

The system 100 may further include either or both of a database 140, maintained by a data vendor, and/or a database 146 maintained by a governmental entity, the databases 140 and 146 being accessible by the insurance provider server 150 for the purpose of obtaining information needed to generate underwriting conclusions in accordance with embodiments of the invention. In particular, in one exemplary embodiment, the databases 140 and 146 may store voting status information for each registered voter, as is commonly tracked by election officials. Information about individual voters is compiled in voter files or voter lists, which may include Name and Address, Party, Age, Registration Date, and Voting History. Voting history is normally provided as the number of times a person has voted in recent elections held in the jurisdiction in which the person can vote. Thus, a list of "4/4" voters for a jurisdiction includes those who have voted in all of the last four elections. A database of those eligible to register to vote also may be provided. The system 100 also may provide access to one or more other data sources represented by the other data vendors 144 in FIG. 1. These external data sources 144 may provide data for various purposes such as coverage recommendation, underwriting, or preparing risk models.

An example of a voting history data vendor is Voter Contact Services of Palo Alto, Calif. See http://www.vcsnet.com/quick/products.php#Voterlists. Examples of governmental sources for voter files are the Secretary of State of the State of Washington and the Department of Elections of the City and County of San Francisco, whose Master Voter File includes voter names, resident & mailing address, precinct number, political party, original registration date, birth place, birth date, city district breakdown, phone number, email address and voting history. See http://www.sfgov.org/site/uploaded-files/election/Candidates_&_Campaigns/Data_Services/Campaign%20Services%20Available%20Files-Public.pdf. Some political party organizations, such as the Texas Democratic Party, also provide voter files. See http://216.239.51.104/search?q=cache:SyUuRk3ywOwJ:www.votermanagement.com/main_2006/documents/TDP_Online_Voter_File_Access_Policy.pdf+%22voter+file%22+price&hl=en&gl=us&ct=clnk&cd=9. Voter files have been maintained by local governments for many years. State governments have become more involved in maintaining voter files since the 2000 Presidential Election.

Figure 2:
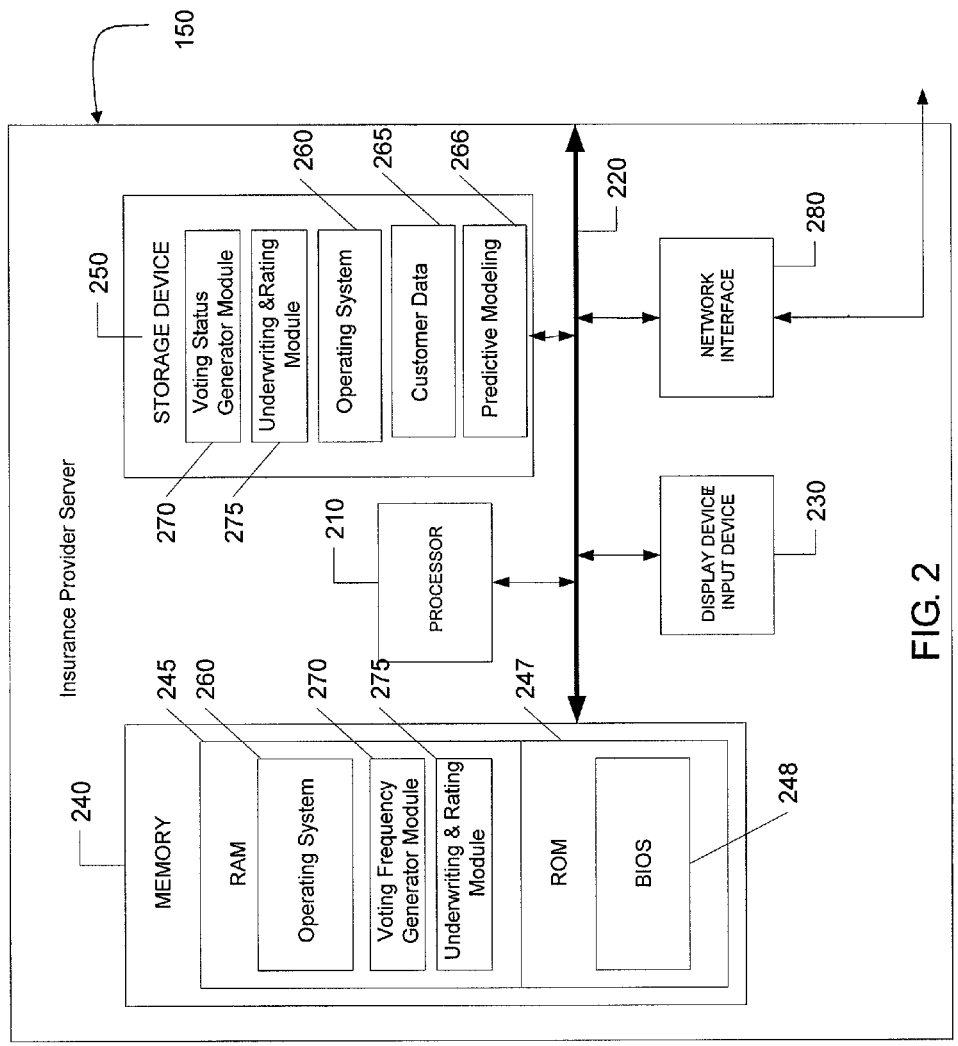
FIG. 2 is a schematic block diagram of the insurance provider server in accordance with exemplary embodiments.

FIG. 2 provides a schematic diagram of the insurance provider server 150 according to one exemplary embodiment of the invention. As shown, the insurance provider server 150 may include a processor 210 that communicates with other elements within the insurance company server 150 via a system interface or bus 220. The processor 210 could be, for example, a central processing unit, microprocessor, microcontroller, programmable gate array, or some other device that processes data. Also included in the insurance provider server 150 of this exemplary embodiment is a display device/input device 230 for receiving and displaying data. The unit 230 may include, for example, an input device such as a keyboard, mouse or pointing device, and a display device such as a monitor, cathode ray tube (CRT), liquid crystal display (LCD), or other such device. The insurance provider server 150 may further include a memory 240, which includes both random access memory (RAM) 245 and read only memory (ROM) 247. The computer's ROM 247 may be used to store a basic input/output system 248 (BIOS), containing the basic routines that help to transfer information between elements within the insurance provider server 150.

In addition, the insurance provider server 150 may include at least one storage device 250, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 250 is connected to the system bus 220 by an appropriate interface. The storage devices 250 and their associated computer-readable media provide non-volatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules comprising, for example, one or more computer-readable program code portions executable by the processor 210, may be stored by the various storage devices 250 and within RAM 245. Such program modules may include an operating system 260, a voting status generator module 270, an underwriting and rating module 275, and a predictive modeling module 266. The voting status generator module 270, predictive modeling module 266, and the underwriting and rating module 275, control certain aspects of the operation of the insurance provider server 150, as is described in more detail below, with the assistance of the processor 210 and the operating system 260.

The storage device 250 may also include a database 265 of customer data for customers of the insurance provider, such as policy information and underwriting information, including the values of the factors used in preparing risk models. In the alternative, the customer data may be stored in another device elsewhere on the network. For example, the customer data may be stored on a separate server (not shown) connected via the network 130 to the insurance provider server 150. The customer data is referred to herein as "internal data" whether it is stored on the insurance provider server 150 or elsewhere under the control of the insurance provider. Similarly, the database 265, wherever located, is referred to herein as an "internal data source." Additional internal data sources may be provided.

Also located within the insurance provider server 150 is a network interface 280, for interfacing and communicating with other elements of a computer network, such as the elements shown in FIG. 1. It will be appreciated by one of ordinary skill in the art that one or more of the insurance provider server 150 components may be located geographically remotely from other insurance provider server 150 components. Furthermore, one or more of the components may be combined, and additional components performing functions described herein may be included in the insurance provider server 150.

Figure 3:
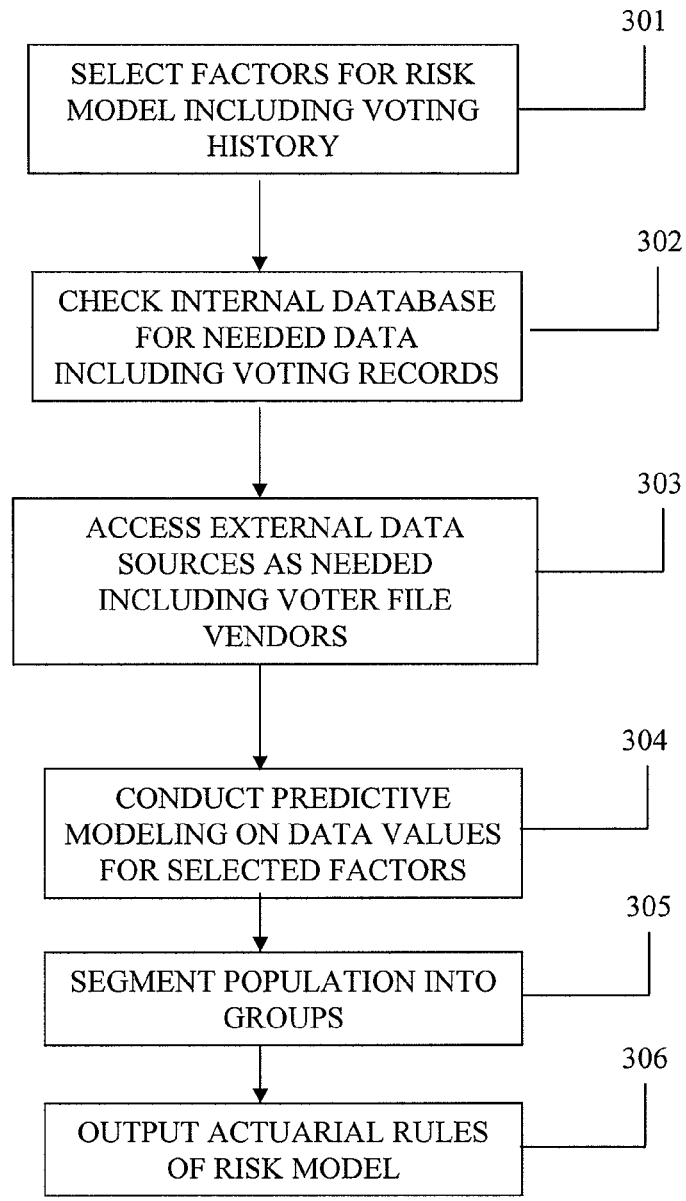
FIG. 3 is a flow chart illustrating the steps which may be performed in order to provide a risk segmentation based at least in part on voting status.
Figure 4:
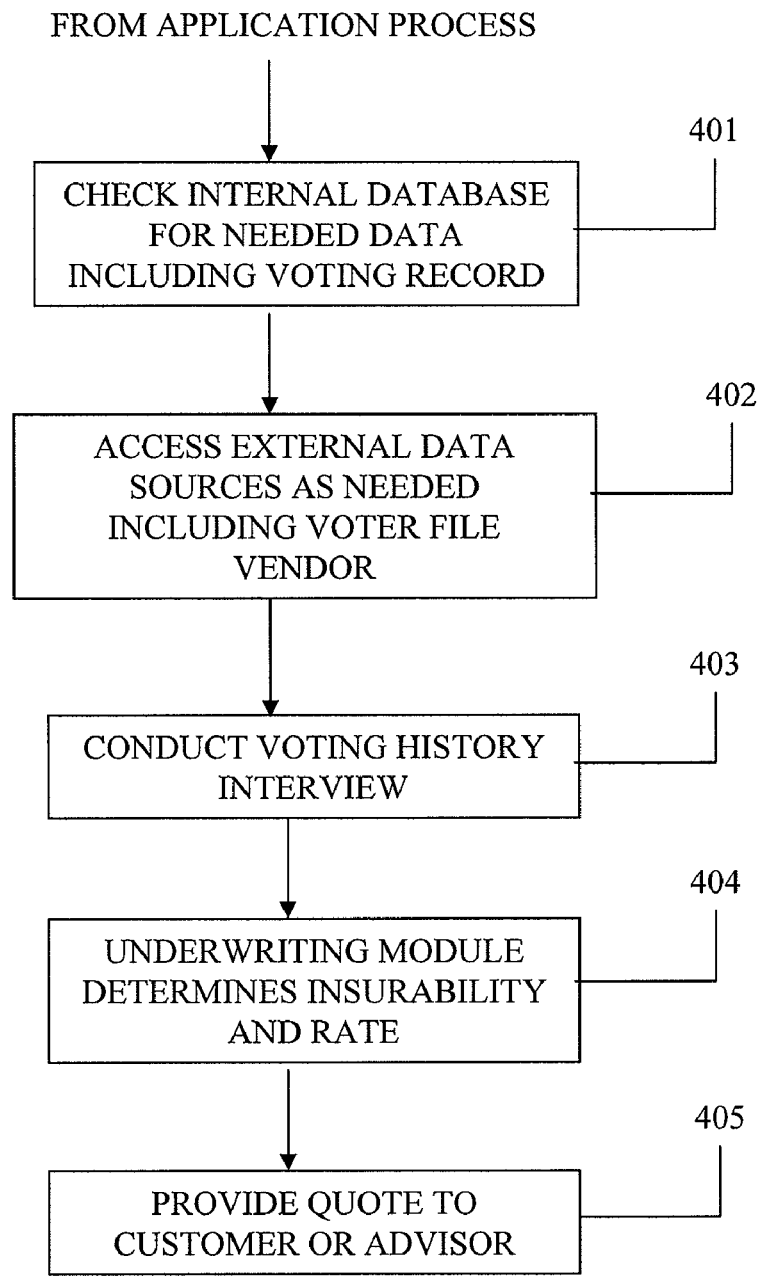
FIG. 4 is a flow chart illustrating a method of underwriting and rating an insurance policy according to an embodiment of the present invention.

Method of Providing a Risk Segmentation Based at Least in Part on Voting Status:

Reference is now made to FIG. 3, which provides a flow chart illustrating the steps which may be taken, according to one exemplary embodiment of the invention, in order to provide a risk model based at least in part on voting status, such as voting frequency, voting history, or an instance or recent voting. As is known to those skilled in the art, the process of preparing a risk model by an insurance provider requires selecting factors to be used in segmenting a population, typically a population of its policyholders. As shown, according to one exemplary embodiment, the process of providing a risk model begins at step 301 where the user, typically an actuary affiliated with the insurance provider, selects the factors to be used. Next at step 302 the voting status generator module 270 searches the internal database 265 for voting histories of the population. If the voting histories of any members of the population are not contained in the database 265, the module 270 at step 303 accesses one or more of the external sources 140, 144, or 146 for such voting history data. Then at step 304 the system segments the population into groups based on the values of the factors for members of the population. This step may be done according to any known method. In a preferred embodiment, step 304 is carried out by the predictive modeling module 266 which runs an analysis to discover risk characterization rules based on the values of the selected factors for the population, in a manner well known in the art. A concept of the present invention of utilizing voting status as a factor in providing a risk model can be implemented using any predictive modeling software that is appropriate for insurance risk modeling. At step 305, at the end of the analysis, segmentation into groups is completed. Finally, at step 306 the system outputs the actuarial rules of the risk model.

In an alternative embodiment of the invention, voting history is weighted differently in the step of segmenting the population on an election-by-election basis according to the voter participation (turnout) for each election. A person whose voting frequency remains high even in off-year or local elections may present a better insurance risk than one whose high voting frequency may be based, for example, on four recent elections including presidential elections or elections in which the issues tended to motivate a broader cross section of the electorate to go to the polls.

Method of Underwriting and Rating an Insurance Policy:

Use of a risk model prepared according to the method described above to underwrite and rate an insurance policy may begin during an application process (not shown) where a user accesses the insurance sales/information website 160 operated by an insurance provider sever 150 using a personal computer (PC), laptop, cellular telephone, personal digital assistant (PDA), or other electronic device 110, 120, in order to, for example, receive quotes for or purchase one or more insurance policies, and/or to renew or modify an existing insurance policy or product. As noted above, the user may be the customer or potential policyholder him-, her-, or itself, or instead may be an advisor. A user within the insurance provider also may obtain access to the processes provided by the insurance provider server 150 and other elements of the system 100 by using the display device/input device 230. During the application process, the customer provides identifying information sufficient for locating the customer's voting status, or, in the alternative, provides information from which a sufficient identification can be found in internal data sources such as database 265 or external data sources 144. At step 401 the voting status generator module 270 uses the customer identification to search the internal database 265 for the customer's voting status information. If the customer's voting status information is not contained in the database 265, at step 402 the voting status generator module 270 accesses one or more of the external sources 140, 144, or 146 for the customer's voting data.

If the customer's voting status is still not found, and the customer is connected online with the insurance sales/information website 160 or present with an agent who is online with voting status generator module 270, optionally at step 403 the voting status generator module 270 may provide interactive interview questions to obtain voting history information directly from the customer.

Once the customer's voting status has been obtained, at step 404 the underwriting module 275 considers the voting history and other customer attributes to determine into which segmented group of the risk model the customer falls, conclude whether the customer is insurable, and assign a premium to the requested or recommended coverage. At step 405, the quote may be provided to the customer or advisor.

Various Internet (online) insurance application processes are known to those skilled in the art, for example as described in U.S. Published Application No. 20040128172; U.S. Published Application No. 20060136274; and U.S. Published Application No. 20020111835, each of which is incorporated herein by reference in its entirety.

The voting status generator module may also be used as part of a pre-screening process according to which, for example, an applicant for insurance coverage provides predetermined information sufficient to perform a risk analysis, which the insurance company uses to determine whether to reject the applicant or prepare a quotation for the coverage. The voting status generator module may also generate lists of persons registered to vote, those who are eligible to register to vote, or those who have voted at a selected rate. Such lists may be used by insurance company marketing departments or by independent insurance agents to identify persons to receive sales solicitations in the form of advertising or personal contact. Voting status information also may be used to more accurately determine loss ratios for existing policy holders, allowing premium levels to be set more accurately and competitively. Agent commissions can be adjusted for the acquisition of new policyholders who meet risk standards that include a voting status component.

It should be understood from the foregoing that among its embodiments the present invention provides a system for providing a risk model for insurance purposes, utilizing a processor and a memory storing an application executable by the processor to segment a population into groups based on one or more factors including voting status and determine risk parameters of each group; provides for utilizing voting status of an individual as a basis for targeting the marketing of insurance solicitations; provides for utilizing voting status of customers to whom an insurance agent sells insurance to adjust the agent's commissions; provides for utilizing voting status of an applicant for insurance to pre-screen the applicant; provides a method of assessing frequency of loss, utilizing an instance of recent voting; and provides a method of assessing frequency of loss, utilizing one or more voting status characteristics.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

The invention claimed is:

1. A computing system for segmenting a population for insurance underwriting, comprising:
   a data storage device;
   a voting status generator module programmed to obtain information providing voting status of members of a population;
   a predictive modeling module programmed to segment the population into groups based at least in part on voting status information stored in the data storage device, and to calculate insurance underwriting risk parameters of each group, the risk parameters including at least one of predicted insurance claim frequency or insurance claim severity; and
   an input/output system to transfer incoming voting status information obtained by the voting status generator module to the data storage device and to output information relating to the groups and their respective insurance underwriting risk parameters.

2. The system of claim 1, wherein voting status information includes the number of times an individual voted in a predetermined number of recent elections.

3. The system of claim 2, wherein calculating insurance underwriting risk parameters includes weighing an individual's voting status based on one of: election type, election turnout, or election type and turnout.

4. The system of claim 1, wherein the predictive modeling module is programmed to segment the population into groups based additionally on one or more of age, gender, driving distance to place of employment, or location.

5. The system of claim 1, wherein the predictive modeling module is programmed to segment the population into groups based on data stored in the data storage device received from one or more internal data sources of an insurance provider and one or more external data sources.

6. The system of claim 5, wherein the one or more external data sources includes a commercial vendor source for a voter file.

7. The system of claim 6, wherein the one or more external data sources includes a governmental source for a voter file.

8. The system of claim 1, wherein voting status includes one or more of voter registration, eligibility for voter registration, an instance of recent voting, or voting frequency.

9. A computerized method for constructing a segmentation-based model for insurance underwriting expressed in the form of actuarial rules, comprising:
   presenting to a computer information providing voting status of members of a population;
   based at least in part on the voting status information, on the computer, generating a segmentation-based risk model by segmenting the population into groups and calculating insurance underwriting risk parameters of each group, the insurance underwriting risk parameters including at least one of predicted insurance claim frequency or insurance claim severity; and
   outputting from the computer actuarial rules of the risk model.

10. The method of claim 9, wherein the actuarial rules define a risk group and its level of risk.

11. The method of claim 9, wherein segmenting the population into groups is based additionally on one or more of age, gender, driving distance to place of employment, or location.

12. The method of claim 9, wherein segmenting the population into groups is based on data stored in the data storage device received from one or more internal data sources of an insurance provider and one or more external data sources.

13. The method of claim 12, wherein the one or more external data sources includes a commercial vendor source for a voter file.

14. The method system of claim 12, wherein the one or more external data sources includes a governmental source for a voter file.

15. The method of claim 9, wherein voting status includes one or more of voter registration, eligibility for voter registration, an instance of recent voting, or voting frequency.

16. A computerized method for underwriting and rating an insurance policy based on a segmentation-based risk model, comprising:
   receiving on a modeling computer module information providing voting status of members of a population;
   on the modeling computer module, based at least in part on the voting status information, generating a segmentation-based risk model by segmenting the population into groups and calculating insurance underwriting risk parameters of each group;

receiving, on an insurance underwriting computer module, the risk model and voting status information characterizing an applicant for insurance;

determining, on the insurance underwriting computer module, based at least in part on the voting status information characterizing the applicant, into which segmented group the applicant falls; and determining, on the insurance underwriting computer module, based on the group into which the applicant falls, whether to offer an insurance policy to the applicant.

17. The method of claim 16, wherein the insurance underwriting computer module receives the applicant's voting status information from a data source.

18. The method of claim 16, wherein the insurance underwriting computer module receives the applicant's voting status information from a voting status generator computer module, the voting status generator computer module providing interactive interview questions to the applicant via a computer network, and receiving responses from the applicant via the network.

19. The method of claim 16, further comprising determining, on the insurance underwriting computer module, a rate structure corresponding to the segmented groups, and proposing insurance coverage limits and a premium to the applicant based on the group into which the applicant falls.

20. The method of claim 19, wherein proposing coverage limits and a premium comprise sending coverage limits and a premium to the applicant via the Internet.

21. The method of claim 16, wherein the risk parameters include at least one of predicted claim frequency or claim severity.

22. The method of claim 16, wherein voting status includes one or more of voter registration, eligibility for voter registration, an instance of recent voting, or voting frequency.

23. A method for identifying persons to receive insurance sales solicitations, comprising:

on an insurance underwriting computer module, based on voting status information stored in a data storage module, generating a list of persons whose voting status comprises at least one of voter registration, eligibility for voter registration, an instance of recent voting, or voting frequency;

outputting said list of persons; and directing a sales solicitation to one or more persons on said list.

24. The method of claim 23, wherein directing a sales solicitation comprises sending the solicitation via a computer network.

25. A computer program product, comprising a non-volatile computer readable medium having recorded thereon computer executable instructions for:

receiving information providing voting status of members of a population;

based at least in part on the voting status information, generating a segmentation-based risk model by segmenting the population into groups and calculating insurance underwriting risk parameters of each group;

receiving voting status information characterizing an applicant for insurance;

determining, based at least in part on the voting status information characterizing the applicant, into which segmented group the applicant falls; and determining, based on the group into which the applicant falls, whether to offer an insurance policy to the applicant.

* * * * *